United States Patent
Li et al.

(10) Patent No.: US 8,568,909 B2
(45) Date of Patent: Oct. 29, 2013

(54) ELECTRODEPOSITION OF FECONIV FILMS WITH HIGH RESISTIVITY AND HIGH SATURATION MAGNETIZATION

(75) Inventors: Feiyue Li, Fremont, CA (US); Xiaomin Liu, Milpitas, CA (US)

(73) Assignee: Headway Technologies, Inc., Milpitas, CA (US)

(*) Notice: Subject to any disclaimer, the term of this patent is extended or adjusted under 35 U.S.C. 154(b) by 0 days.

(21) Appl. No.: 13/469,856

(22) Filed: May 11, 2012

(65) Prior Publication Data

US 2012/0225321 A1 Sep. 6, 2012

Related U.S. Application Data

(62) Division of application No. 10/860,716, filed on Jun. 3, 2004, now Pat. No. 8,177,955.

(51) Int. Cl.
*G11B 5/127* (2006.01)
*G11B 5/187* (2006.01)
*G11B 5/31* (2006.01)
*C22C 38/10* (2006.01)
*C22C 38/12* (2006.01)

(52) U.S. Cl.
CPC ............ *G11B 5/1877* (2013.01); *G11B 5/3133* (2013.01); *C22C 38/10* (2013.01); *C22C 38/12* (2013.01)
USPC ... 428/812; 428/816; 360/125.06; 360/125.3; 360/125.43; 360/125.71; 360/128

(58) Field of Classification Search
None
See application file for complete search history.

(56) References Cited

U.S. PATENT DOCUMENTS

| 5,057,380 | A | * | 10/1991 | Hayashi et al. ............. 428/829 |
| 5,114,800 | A | * | 5/1992 | Shimizu et al. ............. 428/812 |
| 5,314,596 | A | * | 5/1994 | Shukovsky et al. ......... 204/192.2 |
| 5,763,108 | A | | 6/1998 | Chang et al. |
| 6,132,892 | A | * | 10/2000 | Yoshikawa et al. .......... 428/812 |
| 6,233,116 | B1 | | 5/2001 | Chen et al. |
| 6,538,845 | B1 | * | 3/2003 | Watanabe et al. ........ 360/125.43 |
| 6,677,061 | B2 | | 1/2004 | Shimizu et al. |
| 6,682,826 | B2 | | 1/2004 | Shimizu et al. |

(Continued)

FOREIGN PATENT DOCUMENTS

JP 2000-208355 7/2000

OTHER PUBLICATIONS

Nozawa, T., Nouchi, N., and Morimoto, F., IEEE Trans. Mag., 37(4), Jul. 2001, 3033-3038.*

*Primary Examiner* — Kevin Bernatz
(74) *Attorney, Agent, or Firm* — Saile Ackerman LLC; Stephen B. Ackerman (57) ABSTRACT

A magnetic layer that may serve as a top pole layer and bottom pole layer in a magnetic write head is disclosed. The magnetic layer has a composition represented by $Fe_wCo_xNi_yV_z$ in which w, x, y, and z are the atomic % of Fe, Co, Ni, and V, respectively, and where w is between about 60 and 85, x is between about 10 and 30, y is between 0 and about 20, z is between about 0.1 and 3, and wherein w+x+y+z=100. An electroplating process having a plating current density of 3 to 30 mA/cm$^2$ is used to deposit the magnetic layer and involves an electrolyte solution with a small amount of $VOSO_4$ which is the V source. The resulting magnetic layer has a magnetic saturation flux density $B_S$ greater than 1.9 Telsa and a resistivity ρ higher than 70 μohms-cm.

15 Claims, 4 Drawing Sheets

(56) References Cited

U.S. PATENT DOCUMENTS

| | | | |
|---|---|---|---|
| 6,714,380 B2 * | 3/2004 | Kawasaki et al. | 428/815.2 |
| 6,807,027 B2 | 10/2004 | McGeehin et al. | |
| 6,970,324 B2 * | 11/2005 | Ikeda et al. | 360/125.63 |
| 7,138,194 B2 | 11/2006 | Shimizu et al. | |
| 7,192,662 B2 * | 3/2007 | Chen et al. | 428/812 |
| 7,525,770 B2 | 4/2009 | Matono | |
| 2002/0015266 A1 * | 2/2002 | Han et al. | 360/317 |
| 2003/0030943 A1 * | 2/2003 | Han et al. | 360/317 |
| 2004/0252415 A1 * | 12/2004 | Shukh et al. | 360/317 |

\* cited by examiner

FIG. 1 - Conventional

ELECTRODEPOSITION OF FECONIV FILMS WITH HIGH RESISTIVITY AND HIGH SATURATION MAGNETIZATION

This is a Divisional application of U.S. patent application Ser. No. 10/860,716, filed on Jun. 3, 2004, which is herein incorporated by reference in its entirety, and assigned to a common assignee.

TECHNICAL FIELD

The present disclosure relates to a magnetic write head and to a method for making the same and in particular to a magnetic layer with high resistivity and high magnetic flux density for high frequency operations that can serve as a pole layer in an inductive write head.

BACKGROUND

A magnetic disk drive includes a rotating magnetic disk with circular data tracks and magnetic read and write elements in which a write head is typically aligned with (or to) a read head on a slider. During a recording operation, the slider positions the read head and write head which are suspended over the magnetic disk on an air bearing surface (ABS). The write head has bottom and top pole layers that are connected at a back gap region. The bottom and top pole layers each have pole tips that are separated by a write gap layer and terminate at the ABS. In a merged read-write head configuration, the bottom pole also serves as the second shield layer in the read head. An electric current is passed through coils formed around the back gap region to magnetize the bottom and top pole layers.

Figure 1:
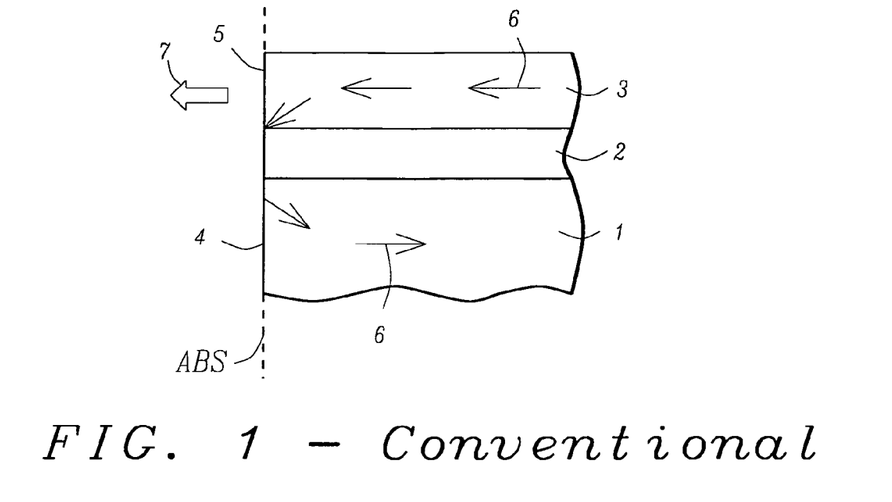
FIG. 1 is a cross-sectional view that depicts a portion of a conventional write head and the path of magnetic flux through a top pole layer to a bottom pole layer.

Referring to FIG. 1, a portion of a conventional write head is shown that includes a bottom pole layer 1, a middle write gap layer 2, and a top pole layer 3 formed along an ABS plane. The bottom pole layer 1 has a pole tip 4 and the top pole layer 3 has a pole tip 5 at the ABS plane. Applying a current to nearby coils (not shown) produces a magnetic flux 6 that passes through the top pole layer 3 and is concentrated at the write gap side of the top pole tip 5. As the write element of the head is moved over a magnetic disk (not shown), the magnetic flux 6 passes from the top pole tip onto a data track and then to the bottom pole tip and is called the gap field. A small flank field 7 is also produced which is minimized to avoid overwriting adjacent data tracks. The rate of writing data to the data track is referred to as recording frequency. Recording density may be increased by decreasing the size of the track width which is defined by the width of the top pole tip in the write head.

A trend in the industry is to increase the recording density and recording frequency which requires a higher saturation magnetic flux density ($B_S$) and higher resistivity ($\rho$) in the top pole layer than provided by conventional write heads. A low coercivity ($H_C$) is also desirable. A high resistivity is needed to reduce eddy current loss at high frequencies while a higher $B_S$ value in a pole layer enables higher recording density and prevents saturation of the pole tips. Unfortunately, electroplated FeCo or FeCoNi films that are generally used in the industry as top and bottom pole layers in a write head have a high $B_S$ value but a relatively low resistivity of less than 20 µohms-cm which limits the high frequency application of the films in magnetic recording heads. On the other hand, when an alternative film that has a high resistivity is employed as the top pole layer, the film usually has an unacceptably low $B_S$ value. Thus, it is desirable to implement a novel magnetic layer that has a $B_S$ value of at least 1.9 Telsa (T) and a resistivity of greater than 70 µohms-cm in order to simultaneously achieve high recording frequencies of greater than about 600 MHz and recording densities higher than 10 Gbit/in$^2$.

Although magnetic layers in read and write heads may be deposited by a sputtering method, an electrodeposition technique otherwise known as an electroplating process is usually preferred because the sputtering process produces a magnetic layer with a large magnetocrystalline anisotropy and higher internal stress. Electroplating is capable of generating a magnetic layer with a smaller crystal grain size and a smoother surface that leads to a high $B_S$ value and low coercive force ($H_C$). In an electroplating process, an electric current is passed through an electroplating cell comprised of a cathode, anode, and an aqueous electrolyte solution of positive ions of the metals to be plated on a substrate (cathode). The anode may have the same composition as the metal being plated. The substrate typically has an uppermost seed layer on which a photoresist layer is patterned to form openings over the seed layer that define the shape of the metal layer to be plated. Once the metal layer is deposited, the photoresist layer and underlying seed layer are removed. The magnetic layers which become a bottom pole and top pole layer in a write head may be formed in this manner.

Although a main pole layer with high $B_S$ value is well known in the art, current technology does not provide a magnetic material with high $B_S$ in combination with a high resistivity for pole layer applications in a write head. Furthermore, a non-magnetic seed layer is needed to promote a low coercivity and the desired resistivity in the main pole of a perpendicular writer.

SUMMARY

One objective of the present disclosure is to provide a magnetic layer that can serve as a top and bottom pole layer in a magnetic write head and which has a resistivity $\rho$ of greater than 70 µohms-cm and a magnetic saturation flux density that is above 1.9 T.

A further objective of the present disclosure is to provide a method of forming the improved magnetic layer according to the first embodiment which can easily be implemented in a magnetic head fabrication process.

According to the first aspect of the present disclosure, a magnetic write head is fabricated that includes a bottom pole layer formed on a substrate, a write gap layer on the bottom pole layer, and a top pole layer on the write gap wherein the aforementioned layers each have an end formed along an ABS plane. In one embodiment, the bottom pole layer is comprised of a soft magnetic material such as CoFe, NiFe, CoNiFe, or FeCoN and the write gap layer is a non-magnetic material that is Al$_2$O$_3$, silicon oxide, or NiCu, for example. An important feature is that the top pole layer has a composition represented by Fe$_W$Co$_X$Ni$_Y$V$_Z$ in which w, x, y, and z are the atomic % of Fe, Co, Ni, and V, respectively, and where w is between 60 and 85, x is between 10 and 30, y is between 0 and 20, z is between about 0.1 and 3, and wherein w+x+y+z=100. Preferably, w is between about 70 and 80, x is from about 10 to 20, y is from about 3 to 5, and z is between about 0.1 and 2. As a result, the top pole layer has a $B_S$ value above 1.9 T (19 kG) and a resistivity ($\rho$) greater than 70 µhms-cm. In one embodiment, y=0, and the top pole layer is comprised of a FeCoV alloy. In an alternative embodiment, the bottom pole layer also has a composition represented by Fe$_W$Co$_X$Ni$_Y$V$_Z$ in which w, x, y, and z are the atomic % of Fe, Co, Ni, and V, respectively, and where w is between 60 and 85, x is between 10 and 30, y is between 0 and 20, z is between about 0.1 and 3, and wherein w+x+y+z=100.

According to a second aspect of the present disclosure, a method is provided for forming the magnetic write head comprised of sequentially forming a bottom pole layer, a write gap layer, and a top pole layer on a substrate and along an ABS plane. In one embodiment, a seed layer such as NiFe is deposited on the substrate. A photoresist layer is then patterned on the seed layer to form an opening with the shape of a bottom pole layer that is to be subsequently deposited. An electroplating process is performed to deposit a bottom pole layer within the opening. The bottom pole layer may be comprised of a soft magnetic material such as CoFe, NiFe, CoNiFe, or FeCoN.

Optionally, an electroplating process is performed that deposits a magnetic layer having the composition represented by $Fe_WCo_XNi_YV_Z$ in which w, x, y, and z are the atomic % of Fe, Co, Ni, and V, respectively, and where w is between 60 and 85, x is between 10 and 30, y is between 0 and 20, z is between about 0.1 and 3, and wherein w+x+y+z=100. The $Fe_WCo_X$-$Ni_YV_Z$ composition is achieved by adding $Ni^{+2}$, $Co^{+2}$, and $Fe^{+2}$ ions as well as $VOSO_4$ to an aqueous electroplating solution comprised of other additives in an electroplating cell that has a Co or Ni anode and the substrate as the cathode. The electroplating solution is maintained between 10° C. and 40° C. while a plating current having a density of 3 to 30 mA/cm² is applied. The bottom pole layer may be magnetically aligned by applying an external magnetic field parallel to the plane of the substrate during the electroplating process or after the resulting magnetic layer has been removed from the electroplating cell. Furthermore, an anneal step may be used after the electroplating process and optionally with the magnetic alignment step.

After the photoresist layer is removed, a write gap layer is deposited by a conventional process and is planarized. Next, a second seed layer is preferably deposited on the write gap layer and a second photoresist layer is patterned on the second seed layer to form an opening that defines the shape of a subsequently deposited top pole layer. An electroplating process as previously described is performed to deposit a top pole layer having the composition represented by $Fe_WCo_XNi_YV_Z$ in which w, x, y, and z are the atomic % of Fe, Co, Ni, and V, respectively, and where w is between 60 and 85, x is between 10 and 30, y is between 0 and 20, z is between about 0.1 and 3, and wherein w+x+y+z=100. The second photoresist layer is removed and the write head fabrication process may be concluded by forming an overcoat dielectric layer on the top pole layer and above the write gap layer.

DETAILED DESCRIPTION

The present disclosure is a magnetic layer in a write head that can serve as a top pole layer and a bottom pole layer and which has a high saturation magnetic flux density and a high resistivity to enable high frequency recording operations. The drawings are provided by way of example and are not intended to limit the scope of the invention. Although a separated read-write head structure is shown, those skilled in the art will appreciate that the magnetic layer disclosed herein may be incorporated in other write head structures used in the industry. Moreover, the write head may be a planar top pole writer, a stitched top pole writer, or a perpendicular recording head. The present disclosure is also a method of forming the novel magnetic layer by an electroplating process.

The inventors have discovered that a magnetic layer comprised of about 60 to 85 atomic % iron, about 10 to 30 atomic % cobalt, 0 to about 20 atomic % nickel, and about 0.1 to 3 atomic % vanadium possesses the desired combination of a high saturation magnetic flux density above 1.9 T and a resistivity greater than 70 μohm-cm.

Figure 2:
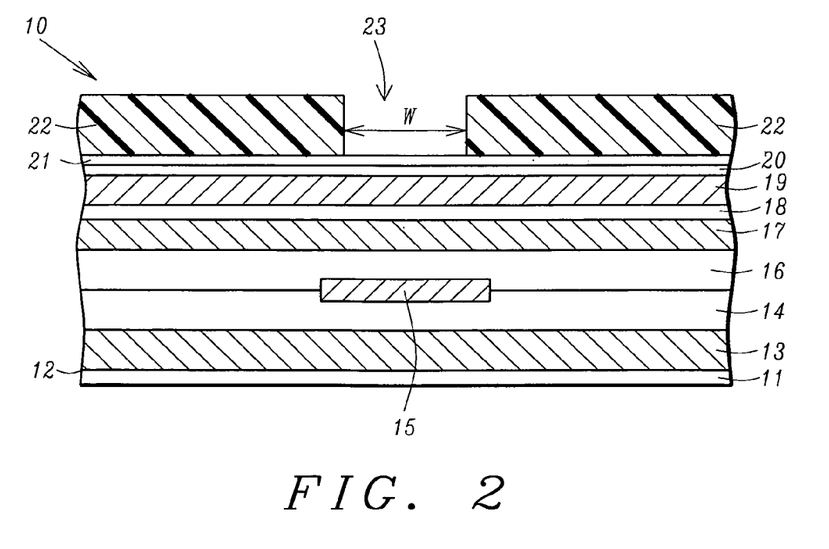
FIG. 2 is a cross-sectional view that depicts the formation of a separated read-write head in which an opening is formed in a patterned photoresist above a write gap layer to define the shape of a top pole according to one embodiment of the present disclosure.
Figure 3:
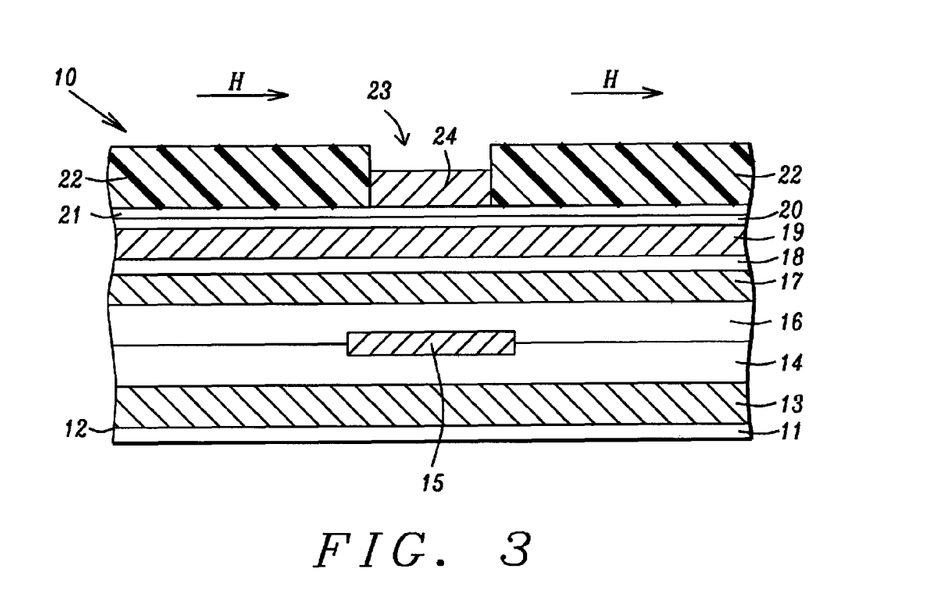
FIG. 3 is a cross-sectional view from the ABS plane of the partially formed read-write head in FIG. 2 after a top pole layer is electroplated within the opening according to an embodiment of the present disclosure.
Figure 4:
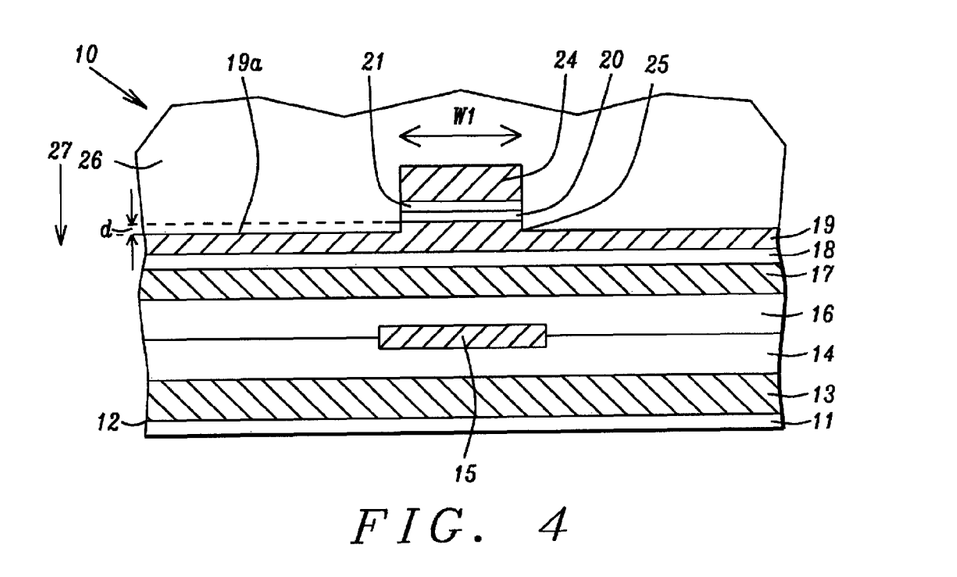
FIG. 4 is a cross-sectional view of the read-write head in FIG. 3 after the photoresist layer and underlying seed layer are removed, a notch underneath the top pole tip region is created in the bottom pole layer, and an overcoat dielectric layer is deposited.

A first embodiment is depicted in FIGS. 2-4 and relates to a method of fabricating the magnetic layer of the present disclosure which is the top pole layer in a write head. The write head is shown as part of a separated read-write head structure but is not limited thereto. Referring to FIG. 2, a partially formed read-write head 10 that is part of a magnetic disk drive is shown as viewed from the plane of an ABS.

The read head portion of the read-write head 10 is comprised of a substrate 11 that may be a ceramic such as AlTiC. The substrate 11 has a top surface 12 that is perpendicular to the ABS. A first shield layer 13 is formed on the substrate 11. Above the first shield layer 13 is sequentially formed a first insulation layer 14 and a second insulation layer 16 with a sensor element 15 formed therein along an interface between the first and second insulation layers which are made of $Al_2O_3$ or silicon oxide, for example. The sensor element 15 is preferably based on a giant magnetoresistive (GMR) configuration comprised of a pinned layer, an anti-ferromagnetic (AFM) layer, and a free layer (not shown). Above the second insulation layer 16 is a second shield layer 17 which forms the top layer in the read head. The read head portion of the read-write head 10 is formed by conventional methods that are not described herein.

The bottom pole layer 19 in the write head is separated from the second shield layer 17 by a thin $Al_2O_3$ layer 18. In this embodiment, the bottom pole layer 19 is formed by an electroplating or sputtering method and is comprised of a magnetic material such as CoFe, NiFe, CoNiFe, or FeCoN with a thickness of about 3 to 6 microns. It is understood that the formation of the bottom pole layer 19 may involve depositing a seed layer (not shown) and patterning a photoresist layer (not shown) before electroplating the bottom pole layer within an opening in the photoresist layer. In this case, the photoresist layer and underlying seed layer are removed before the write gap layer is deposited. A write gap layer 20 comprised of a non-magnetic material such as $Al_2O_3$, silicon oxide, or NiCu is formed on the bottom pole layer 19 and has a thickness between 0.5 and 3 microns. When an oxide is employed as the write gap layer 20, the oxide may be deposited by a plasma enhanced chemical vapor deposition (PECVD) or a physical vapor deposition (PVD) process.

Preferably, a seed layer 21 with a thickness of about 0.05 to 0.4 microns is deposited on the write gap layer 20 by a PVD, sputtering, or ionic metal plasma (IMP) method. The seed layer 21 may be comprised of NiFe, CoFeN, or CoFe. Alternatively, the seed layer has the same composition as the subsequently deposited top pole layer. The seed layer 21 serves to promote the deposition of a top pole layer in an electroplating process which will be explained in a later section. A photoresist layer 22 is patterned on the seed layer to generate an opening 23 having a width w at the ABS that defines the shape of a pole tip region in the top pole layer of the write head. Those skilled in the art will appreciate that the pole tip region having a width w typically extends less than a micron toward the back end of the write head and that from a top view (not shown) the opening 23 also defines the shape of the remainder of the top pole layer that may extend a distance of up to 25 microns or more from the ABS and has a width substantially greater than w. The thickness of the photoresist layer 22 is about 1 to 5 microns.

Referring to FIG. 3, a key step in the method of the first embodiment is an electroplating process that deposits a top pole layer 24 which preferably has a composition represented by $Fe_wCo_xNi_yV_z$ in which w, x, y, and z are the atomic % of Fe, Co, Ni, and V, respectively, and where w is between 60 and 85, x is between 10 and 30, y is between 0 and 20, z is between about 0.1 and 3, and wherein w+x+y+z=100. More preferably, w is from 70 to 80, x is between 10 and 20, y is between 3 and 5, and z is between 0.1 and 2. Note that the thickness of the top pole layer 24 does not exceed the thickness of the photoresist layer 22 and is preferably in a range of about 0.3 to 4.0 microns. In one embodiment, y=0 and a FeCoV alloy is formed. Alternatively, a FeCoNiV alloy is formed as the top pole layer.

The inventors have discovered that a FeCoNiV alloy with the aforementioned composition may be formed by an electroplating process that involves immersing the read-write head 10 in an electrolyte solution contained within an electrochemical cell comprised of an anode which is preferably Co or Ni. The read-write head and specifically the exposed portions of the seed layer 21 within the opening 23 become the cathode during the electroplating process. The electrolyte solution is an aqueous solution having a pH between 2.0 and 4.0 and includes $Fe^{+2}$ ions, $Co^{+2}$ ions, $Ni^{+2}$ ions, and $VO^{+2}$ ions which are provided by adding the following metal salts at the indicated concentrations in grams per liter: $FeSO_4.7H_2O$ (30 to 70 g/L); $CoSO_4.7H_2O$ (10-40 g/L); $NiSO_4.6H_2O$ (0 to 40 g/L); $NiCl_2.6H_2O$ (0 to 10 g/L); and $VOSO_4.xH2O$ (0.02 to 10 g/L). Additionally, the electrolyte solution is comprised of other additives and supporting electrolytes including but not limited to $H_3BO_3$ with a concentration of 26 to 27 g/L, $NH_4Cl$ at a concentration of 0 to 20 g/L, $(NH_4)_2SO_4$ at a concentration of 0 to 30 g/L, sodium saccharin at a concentration of 0 to 2.0 g/L, and sodium lauryl sulfate at a concentration of 0.01 to 0.15 g/L. Optionally, if a FeCoV alloy is desired as the top pole layer 24, the $NiCl_2.6H_2O$ and $NiSO_4.6H_2O$ salts are excluded from the electrolyte solution and the anode is preferably Co. Preferably, the electroplating is performed with an electrolyte solution temperature between 10° C. and 40° C. and with a plating current density of from 3 to 30 mA/cm². Using these conditions, the top pole layer 24 is deposited at the rate of about 50 to 700 Angstroms per minute on the exposed portions of the seed layer 21. It is understood that the electrolyte solution may be mechanically agitated during the electroplating process. Furthermore, either a direct current (DC) or pulsed DC mode may be used with a duty ratio of about 0.4 to 0.6 and a cycle time of about 100 ms.

In one embodiment, the top pole layer 24 is magnetically aligned during the electroplating process by applying an external magnetic field H of about 2000 gauss in a direction parallel to the ABS plane and parallel to the top surface 12 of the substrate. This step helps to impart the desired magnetic properties in the top pole layer 24. The present disclosure also encompasses a thermal anneal step after the top pole layer 24 is magnetically aligned and the substrate 11 is removed from the electroplating solution. Optionally, the top pole layer 24 is magnetically aligned following the electroplating process and after the substrate 11 is removed from the electrolyte solution by applying a magnetic field H as described previously. In this case, a thermal anneal step may be performed simultaneously with the application of a magnetic field H.

The resulting top pole layer following the magnetic alignment and optional anneal step has been characterized and found to have a composition represented by $Fe_wCo_xNi_yV_z$ in which w, x, y, and z are the atomic % of Fe, Co, Ni, and V, respectively, and where w is between 60 and 85, x is between 10 and 30, y is between 0 and 20, z is between about 0.1 and 3, and wherein w+x+y+z=100. The $Fe_wCo_xNi_yV_z$ alloy according to the present disclosure has been further characterized and found to have a saturation magnetic flux density $B_S$ of greater than 1.9 T and an electrical resistivity $\rho$ of greater than 70 μohm-cm. The $B_S$ and resistivity values are higher than what has been achieved simultaneously in a magnetic layer of a prior art write head. Thus, the write head of the present disclosure is capable of higher recording frequencies than is possible with conventional write heads. In a $Fe_wCo_xNi_yV_z$ alloy where w is between 70 and 80, x is between 10 and 20, y is between 3 and 5, z is between 0.1 and 2, and w+x+y+z=100, a magnetic layer thereof formed according to a method of the present invention has an easy axis coercive field ($H_C$) of less than 20 Oe and an anisotropy field ($H_K$) of less than 30 Oe. The inventors have found that a Fe content above 85 atomic % leads to a large grain size that lowers performance while a Fe content below 60 atomic % reduces the Bs value. A V content above 3 atomic % reduces the Bs value while a V content below 0.1% results in no significant increase in resistivity.

Referring to FIG. 4, the photoresist layer 22 is removed by a conventional method such as a wet stripper or an oxygen ash process. The top pole layer 24 which has a width w then serves as an etch mask while the seed layer 21 and the write gap layer 20 not covered by the top pole layer are removed by an ion beam etch (IBE) known to those skilled in the art. The IBE process also trims the tip of the top pole layer 24 to a width $w_1$ and continues into the bottom pole layer 19 to remove a portion thereof. A notch 25 and a new top surface 19a are created by removing a thickness d from the top portion of the bottom pole layer 19 not covered by the top pole layer 24. The thickness d is preferably about 2 to 5 times greater than the write gap layer thickness. The width $w_1$ of the top pole layer 24 which is about 0.2 to 0.4 microns will define the track width of the write head which moves in a direction 27 during a write operation. The vertical sidewalls of the notch 25 coincide with the sides of the top pole layer 24, seed layer 21, and write gap layer 20.

Once the IBE process that forms a notch 25 in the bottom pole layer 19 is completed, an overcoat layer 26 is deposited on the top pole layer 24 and on the top surface 19a of the bottom pole layer. The overcoat layer 26 is typically an oxide such as $Al_2O_3$ or silicon oxide which is deposited by a PECVD or PVD method. At this point, the write head portion of the read-write head 10 is essentially complete. A planarization process (not shown) may be used to form a smooth top surface on the overcoat layer 26. It is understood that the write head is comprised of other elements such as a coil layer and additional dielectric layers which are formed by conventional methods known to those skilled in the art but which are not shown in a cross-sectional view from the ABS plane in FIG. 4.

Those skilled in the art will recognize that the method of forming the magnetic layer of the present disclosure can be easily implemented in the fabrication of a read-write head since the required materials and equipment are readily available and in most cases are already used for other processes. In particular, the electroplating process for forming a FeCoV or FeCoNiV alloy according to the present invention is readily accomplished by the addition of $VO^{+2}$ ions to an existing electrolyte solution.

Figure 5:
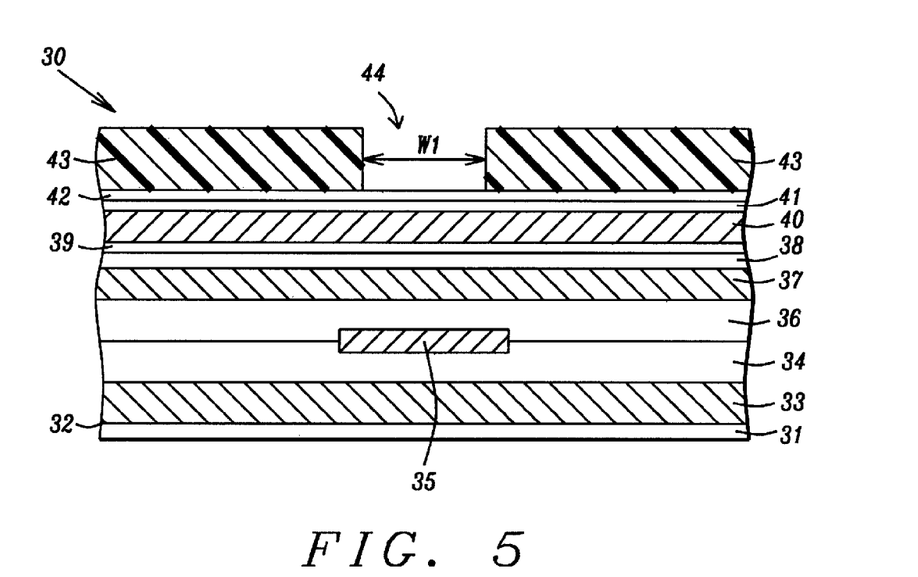
FIG. 5 is a cross-sectional view from the ABS plane of a separated read-write head in which a bottom pole layer is plated on a seed layer and a photoresist pattern is formed on a second seed layer above a write gap layer according to a second embodiment of the present disclosure.
Figure 6:
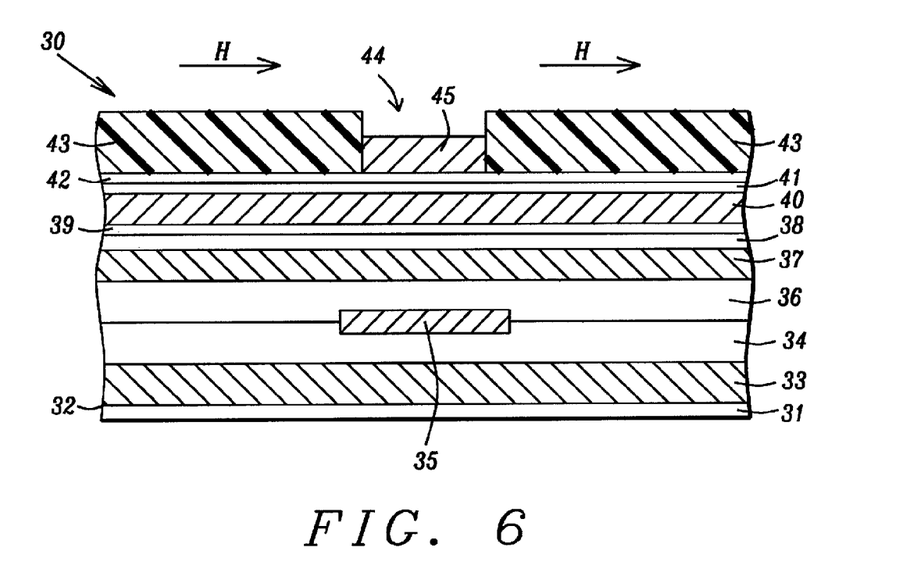
FIG. 6 is a cross-sectional view of the partially formed read-write head in FIG. 5 after a top pole layer is electroplated in the opening within the photoresist pattern.
Figure 7:
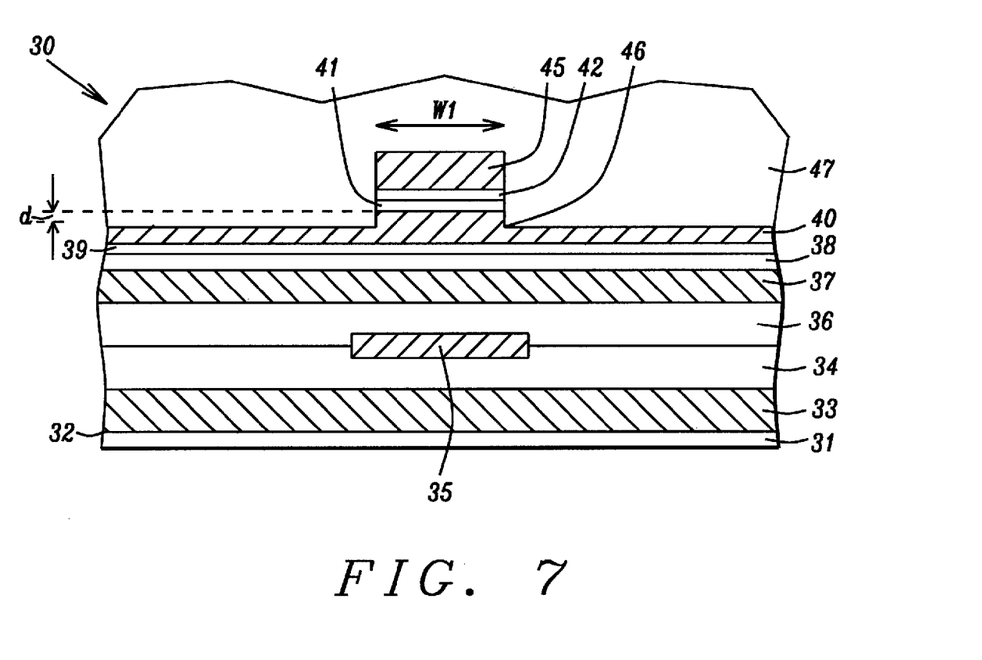
FIG. 7 is a cross-sectional view of the read-write head structure in FIG. 6 after the photoresist layer and underlying seed layer are removed, a notch underneath the top pole layer is created in the bottom pole layer, and an overcoat dielectric layer is deposited.

In a second embodiment illustrated in FIGS. 5-7, the magnetic layer according to the present disclosure is used as a bottom pole layer and a top pole layer in a write head. Although a separated read-write head structure is shown, the write head is not limited thereto. A method of forming the magnetic layer of the present disclosure will now be described.

Referring to FIG. 5, a cross-sectional view from an ABS is shown of a read-write head 30 which is comprised of a substrate 31 that may be a ceramic such as AlTiC. The substrate 31 has a top surface 32 that is perpendicular to the ABS. A first shield layer 33 is formed on the substrate 31. Above the first shield layer 33 is sequentially formed a first insulation layer 34 and a second insulation layer 36 with a sensor element 35 formed therein along an interface between the first and second insulation layers. The sensor element 35 is preferably based on a giant magnetoresistive (GMR) configuration comprised of a pinned layer, an anti-ferromagnetic (AFM) layer, and a free layer as appreciated by those skilled in the art. There is typically a hard bias layer (not shown) on each side of the sensor element which provides a longitudinal bias to influence the magnetic direction of the free layer along an axis parallel to the ABS and parallel to the top surface 32 of the substrate. A second shield layer 37 is formed by sputter depositing a seed layer (not shown) on the second insulation layer 36 and then electroplating the second shield layer on the seed layer to complete the formation of the read head portion of the read-write head 30. Then an $Al_2O_3$ layer 38 is formed on the second shield layer to separate the read portion from a subsequently formed write portion of the read-write head.

The write head is fabricated by depositing a first seed layer 39 with a thickness of about 0.05 to 0.4 microns on the $Al_2O_3$ layer 38 by a PVD, sputtering, or IMP method. The first seed layer 39 may be comprised of NiFe, CoFeN, or CoFe. Alternatively, the seed layer has the same composition as the subsequently deposited bottom pole layer. The first seed layer 39 serves to promote the deposition of a bottom pole layer during an electroplating process.

A photoresist layer (not shown) is patterned on the first seed layer 39 to form an opening that defines the shape of the bottom pole layer. Then the bottom pole layer 40 of the write head is preferably deposited within the opening by an electroplating technique and has an as-plated thickness of about 3 to 6 microns. Preferably, the bottom pole layer 40 has a composition represented by $Fe_WCo_XNi_YV_Z$ in which w, x, y, and z are the atomic % of Fe, Co, Ni, and V, respectively, and where w is between 60 and 85, x is between 10 and 30, y is between 0 and 20, z is between about 0.1 and 3, and wherein w+x+y+z=100. More preferably, w is from 70 to 80, x is between 10 and 20, y is between 3 and 5, and z is from about 0.1 to 2. Optionally, y=0 and a FeCoV alloy is formed.

The inventors have discovered that a FeCoNiV or FeCoV alloy with the aforementioned composition may be formed by an electroplating process that involves immersing said read-write head 30 in an electrolyte solution contained within an electrochemical cell comprised of an anode which is preferably Co or Ni. The read-write head and specifically the exposed portion of the first seed layer 39 becomes the cathode during the electroplating process. The electrolyte solution is an aqueous solution having a pH between 2.0 and 4.0 and includes $Fe^{+2}$ ions, $Co^{+2}$ ions, $Ni^{+2}$ ions, and $VO^{+2}$ ions which are provided by adding the following salts at the indicated concentrations: $FeSO_4.7H_2O$ (30 to 70 g/L); $CoSO_4.7H_2O$ (10-40 g/L); $NiSO_4.6H_2O$ (0 to 40 g/L); $NiCl_2.6H_2O$ (0 to 10 g/L); and $VOSO_4.xH2O$ (0.02 to 3.0 g/L). Additionally, the electrolyte solution is comprised of other additives and supporting electrolytes including but not limited to $H_3BO_3$ with a concentration of 26 to 27 g/L, $NH_4Cl$ at a concentration of 0 to 20 g/L, $(NH_4)_2SO_4$ at a concentration of 0 to 30 g/L, sodium saccharin at a concentration of 0 to 2.0 g/L, and sodium lauryl sulfate at a concentration of 0.01 to 0.15 g/L. When a FeCoV alloy is desired as the bottom pole layer 40, the $NiCl_2.6H_2O$ and $NiSO_4.6H_2O$ salts are excluded from the electrolyte solution and the anode is preferably Co. Preferably, the electroplating is performed with an electrolyte solution temperature between 10° C. and 40° C. and with a plating current density from 3 to 30 mA/cm$^2$. Using these conditions, the bottom pole layer 38 is deposited at the rate of about 50 to 700 Angstroms per minute on the exposed portions of the seed layer 39.

In one embodiment, the bottom pole layer 40 is magnetically aligned during the electroplating process by applying an external magnetic field in a direction parallel to the ABS plane and parallel to the top surface 32 of the substrate. This step helps to impart the desired magnetic properties in the bottom pole layer 40. The present disclosure also encompasses a thermal anneal step after the bottom pole layer 40 is magnetically aligned and the substrate 31 is removed from the electroplating solution. Optionally, the bottom pole layer 40 is magnetically aligned following the electroplating process and after the substrate 31 is removed from the electrolyte solution by applying a magnetic field as described previously. In this case, a thermal anneal step may be performed simultaneously with the application of a magnetic field.

Following the electroplating step to form the bottom pole layer 40, the photoresist layer is removed by a wet stripper or an ashing process. The bottom pole layer 40 then serves as an etch mask while the first seed layer 39 not covered by the bottom pole layer is removed by an IBE process. Next, a write gap layer 41 comprised of a non-magnetic material such as $Al_2O_3$, silicon oxide, or NiCu is formed on the bottom pole layer 40 and has a thickness between 0.5 and 3 microns. When an oxide is employed as the write gap layer 41, the oxide may be deposited by a PECVD or PVD process.

A second seed layer 42 with a thickness of about 0.05 to 0.4 microns is then deposited on the write gap layer by a PVD, IMP, or sputter process and may be selected from the same group of materials as described for the first seed layer 39.

Alternatively, the second seed layer 42 is formed of the same material that will be used in a subsequently deposited top pole layer.

A photoresist layer 43 having a thickness of about 1 to 5 microns is patterned on the second seed layer 42 to produce an opening 44 having a width w of about 0.2 to 0.4 microns at the ABS that defines the shape of a pole tip region in the top pole layer of the write head. Those skilled in the art will appreciate that the pole tip region having a width w typically extends less than a micron toward the back end of the write head and that from a top view (not shown) the opening 44 also defines the shape of the remainder of the top pole layer that may extend a distance of up to 25 microns or more from the ABS and has a width substantially greater than w.

Referring to FIG. 6, an important step in the method of the second embodiment is an electroplating process that deposits a top pole layer 45 which preferably has the same composition as the bottom pole layer 40. Note that the thickness of the top pole layer 45 does not exceed the thickness of the photoresist layer 43 and is preferably in a range of about 0.3 to 4.0 microns. In one embodiment, y=0 and a FeCoV alloy is formed. Alternatively, a FeCoNiV alloy is formed as the top pole layer 45. The top pole layer is preferably formed by the same electroplating process as used to deposit the bottom pole layer 40. Likewise, the top pole layer 45 may be magnetically aligned by applying an external magnetic field H of about 2000 Oe during or after the electroplating step. Additionally, a thermal anneal step may be performed once the read-write head 30 is removed from the electroplating solution. In this case, the anneal step may occur simultaneously with the magnetic alignment by an external magnetic field H. Note that the electroplating process used to deposit the top pole layer 45 and bottom pole layer 40 may be performed in a single wafer mode or in a batch process. A DC or pulsed DC current may be employed as described previously.

The resulting bottom and top pole layers 40, 45, respectively, following the magnetic alignment and optional anneal step have been characterized by XRF and found to have a composition represented by $Fe_W Co_X Ni_Y V_Z$ in which w, x, y, and z are the atomic % of Fe, Co, Ni, and V, respectively, and where w is between 60 and 85, x is between 10 and 30, y is between 0 and 20, z is between about 0.1 and 3, and wherein w+x+y+z=100. The $Fe_W Co_X Ni_Y V_Z$ alloy according to the present invention has been further characterized and found to have a saturation magnetic flux density $B_S$ of greater than 1.9 T, an easy axis coercive field $H_C$ of less than 20 Oe, an anisotropy field $H_K$ less than 30 Oe, and an electrical resistivity ρ of greater than 70 μohm-cm. The $B_S$ and resistivity values are higher than what has been achieved simultaneously in a magnetic layer of a prior art write head. Thus, the write head of the present disclosure is capable of higher recording frequencies than is possible in conventional write heads.

Referring to FIG. 7, the photoresist layer 43 is removed by a conventional method such as a wet stripper or an oxygen ash process. The top pole layer 45 then serves as an etch mask while the second seed layer 42 and write gap layer 41 not covered by the top pole layer are removed by an IBE process. The IBE process is continued to remove a thickness d about 2 to 5 times greater than the thickness of the write gap layer from the top portion of the bottom pole layer 40 not covered by the top pole layer 45. As a result, a new top surface 40a and a notch 46 are formed on the bottom pole layer. The vertical sidewalls of the notch extend upward along the sides of the write gap layer 41 and second seed layer 42. Moreover, the tip of the top pole layer 45 is trimmed to a width $w_1$ of about 0.2 to 0.4 microns by the IBE process. The width $w_1$ defines the track width in the write head. Additional dielectric layers (not shown) may be formed between the top pole layer and bottom pole layer to insulate a coil layer. After coils (not shown) comprised of copper, for example, are wound around a back gap region that connects the top pole layer and bottom pole layer, an overcoat layer 47 is deposited on the top pole layer 45 and top surface 40a of the bottom pole layer. The overcoat layer 47 is typically an oxide such as $Al_2O_3$ or silicon oxide which is deposited by a PECVD or PVD method. At this point, the write head portion of the read-write head 30 is essentially complete. A planarization process may be employed to form a smooth top surface on the overcoat layer 47.

As indicated previously, the magnetic layer of the present disclosure can be easily implemented in the fabrication of a read-write head since the required materials and equipment are readily available and in most cases are already used for other processes. In particular, the electroplating process for forming a FeCoV or FeCoNiV alloy according to the present disclosure is readily accomplished by the addition of $VO^{+2}$ ions to an existing electrolyte solution.

While this disclosure has been particularly shown and described with reference to, the preferred embodiment thereof, it will be understood by those skilled in the art that various changes in form and details may be made without departing from the spirit and scope of this disclosure.

We claim:

1. A magnetic layer having an elemental composition, comprising:
    (a) about 60 to less than 80 atomic % iron;
    (b) about 10 to 30 atomic % cobalt;
    (c) 0 to about 20 atomic % nickel; and
    (d) about 0.1 to 3 atomic % vanadium wherein a total atomic % for the FeCoV or FeCoNiV layer is 100 atomic %.

2. The magnetic layer of claim 1 wherein the FeCoV or FeCoNiV layer is formed as a top pole layer in a magnetic write head.

3. The magnetic layer of claim 2 wherein said top pole layer has a thickness of about 0.3 to 4 microns.

4. The magnetic layer of claim 1 wherein the FeCoV or FeCoNiV layer is formed as a top pole layer and as a bottom pole layer in a magnetic write head.

5. The magnetic layer of claim 1 wherein the magnetic saturation flux density $B_S$ is greater than 1.9 Telsa and the resistivity ρ is higher than 70 μohms-cm.

6. The magnetic layer of claim 1 wherein the FeCoNiV layer has a composition of about 70 to 80 atomic % Fe, about 10 to 20 atomic % Co, about 3 to 5 atomic % Ni, and about 0.1 to 2% V and wherein the $B_S$ is greater than 1.9 T, ρ is larger than 70 μohms-cm, the easy axis coercive field ($H_C$) is less than 20 Oe, and the anisotropy field ($H_K$) is less than 30 Oe.

7. The magnetic layer of claim 1 wherein the FeCoV or FeCoNiV layer is formed on a seed layer that is one of CoFe, CoFeN, or NiFe, or the seed layer has the same elemental composition as the magnetic layer.

8. A magnetic write head, comprising:
    (a) a bottom pole layer formed on a substrate;
    (b) a write gap layer on said bottom pole layer;
    (c) a seed layer that contacts a top surface of the write gap layer, the seed layer is made of CoFe, NiFe, CoFeN, or has a composition represented by $Fe_W Co_X Ni_Y V_Z$ in which w, x, y, and z are the atomic % of Fe, Co, Ni, and V, respectively, and where w is between about 60 and 85, x is between about 10 and 30, y is between 0 and about 20, z is between about 0.1 and 3, and wherein w+x+y+z=100; and (d) a top pole layer contacting a top surface of the seed layer wherein said top pole layer and the bottom pole layer have an equivalent $Fe_W Co_X Ni_Y V_Z$ composition.

9. The magnetic write head of claim 8 wherein the magnetic write head is part of a separated read-write head structure and the bottom pole layer is formed on an $Al_2O_3$ layer that separates the write head from the read head.

10. The magnetic write head of claim 8 wherein the magnetic write head is a planar writer, a stitched pole writer, or a perpendicular recording head.

11. The magnetic write head of claim 8 wherein the bottom pole layer has a thickness of about 3 to 6 microns.

12. The magnetic write head of claim 8 wherein the seed layer has a thickness of about 0.05 to 0.4 microns.

13. The magnetic write head of claim 8 wherein the top pole layer has a thickness of about 0.3 to 4 microns and a track width of about 0.2 to 0.4 microns.

14. The magnetic write head of claim 8 wherein the top pole layer has a magnetic saturation flux density $B_S$ greater than 1.9 Telsa and a resistivity $\rho$ higher than 70 μohms-cm.

15. The magnetic write head of claim 8 wherein the top pole layer has a composition of about 70 to 80 atomic % Fe, about 10 to 20 atomic % Co, about 3 to 5 atomic % Ni, and about 0.1 to 2% V and wherein the $B_S$ is greater than 1.9 T, $\rho$ is larger than 70 μohms-cm, the easy axis coercive field ($H_C$) is less than 20 Oe, and the anisotropy field ($H_K$) is less than 30 Oe.

* * * * *

UNITED STATES PATENT AND TRADEMARK OFFICE
CERTIFICATE OF CORRECTION

| | | |
|---|---|---|
| PATENT NO. | : 8,568,909 B2 | Page 1 of 1 |
| APPLICATION NO. | : 13/469856 | |
| DATED | : October 29, 2013 | |
| INVENTOR(S) | : Feiyue Li and Xiaomin Liu | |

It is certified that error appears in the above-identified patent and that said Letters Patent is hereby corrected as shown below:

On the Title page, Item (54) and in the Specification, Col. 1, Lines 1-3, in the Title, delete "ELCTRODEPOSITION OF FECONIV FILMS WITH HIGH RESISTIVITY AND HIGH SATURATION MAGNETIZATION" and replace with -- ELECTRODEPOSITION OF FeCoNiV FILMS WITH HIGH RESISTIVITY AND HIGH SATURATION MAGNETIZATION --.

Signed and Sealed this
Seventh Day of January, 2014

Margaret A. Focarino
*Commissioner for Patents of the United States Patent and Trademark Office*